(12) United States Patent
Tao

(10) Patent No.: US 6,459,230 B1
(45) Date of Patent: Oct. 1, 2002

(54) METHOD AND SYSTEM FOR MEASURING A PARAMETER OF MOTOR OPERATION

(75) Inventor: Jinghan Tao, Brown Deer, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/782,438

(22) Filed: Feb. 13, 2001

(51) Int. Cl.[7] .................................................. H02P 7/36
(52) U.S. Cl. ........................ 318/798; 318/799; 318/802; 318/803; 318/804; 318/805; 318/806; 318/807; 318/808; 318/809; 318/810; 318/811; 318/812
(58) Field of Search ................................. 318/798, 799, 318/802–812

(56) References Cited

U.S. PATENT DOCUMENTS

| | | | |
|---|---|---|---|
| 4,275,343 A | * 6/1981 | Fulton et al. ................ 318/721 |
| 4,361,791 A | 11/1982 | Plunkett ..................... 318/723 |
| 4,680,695 A | 7/1987 | Kerkman et al. ........... 363/160 |
| 4,689,542 A | 8/1987 | Ibori et al. .................. 318/778 |
| 4,734,634 A | 3/1988 | Kito et al. .................. 318/778 |
| 4,839,589 A | 6/1989 | Heinle ........................ 324/166 |
| 4,958,117 A | 9/1990 | Kerkman et al. ........... 318/805 |
| RE33,519 E | 1/1991 | Ibori et al. .................. 318/778 |
| 5,032,771 A | 7/1991 | Kerkman et al. ............. 318/52 |
| 5,140,248 A | 8/1992 | Rowan et al. .............. 318/811 |
| 5,298,847 A | 3/1994 | Kerkman et al. ........... 318/800 |
| 5,347,443 A | 9/1994 | Muramatsu et al. .......... 363/98 |
| 5,448,150 A | 9/1995 | Yamamoto et al. ......... 318/805 |
| 5,510,689 A | 4/1996 | Lipo et al. .................. 318/809 |
| 5,537,308 A | 7/1996 | Gritter ......................... 363/95 |
| 5,654,624 A | 8/1997 | Schroderus .................. 322/39 |
| 5,659,231 A | 8/1997 | Svarovsky et al. ......... 318/368 |
| 5,668,459 A | 9/1997 | Kim .......................... 318/798 |
| 5,798,628 A | 8/1998 | Fujita et al. ................ 318/805 |
| 5,811,956 A | 9/1998 | Yamamoto .................. 318/801 |
| 6,014,007 A | 1/2000 | Seibel et al. ................ 318/805 |
| 6,018,225 A | * 1/2000 | Garces ....................... 318/798 |
| 6,081,084 A | * 6/2000 | Crecelius .................... 318/145 |

* cited by examiner

*Primary Examiner*—Robert E. Nappi
*Assistant Examiner*—Rita Leykin
(74) *Attorney, Agent, or Firm*—David G. Luettgen; Alexander M. Gerasimow; William R. Walbrun

(57) ABSTRACT

A method of reconnecting a motor to a motor drive comprises controlling a current which flows through the motor using a current regulator. The current regulator produces a voltage command output based on a current command input. A current is commanded at the current command input of the current regulator. Back EMF measurements are acquired at different instants in time by monitoring the voltage command output of the current regulator. Back EMF phase angles are determined for a plurality of the instants in time based on a respective plurality of the back EMF measurements. A frequency of the back EMF is determined based on the back EMF angles determined for the plurality of instants in time. The motor drive is reconnected to the motor based on the frequency of the back EMF.

50 Claims, 7 Drawing Sheets

METHOD AND SYSTEM FOR MEASURING A PARAMETER OF MOTOR OPERATION

BACKGROUND OF THE INVENTION

1. Field of the Invention

This invention relates to a method and system for measuring a parameter of motor operation, such as rotor speed, rotor direction, back EMF magnitude and/or back EMF phase angle. In a particularly preferred embodiment, this invention relates to a method and system in which each of these parameters is measured for purposes of reconnecting a motor to a motor drive.

2. Description of Related Art

There are many instances in which it is desirable to measure one or more parameters of motor operation. Typical parameters of interest include rotor speed, rotor direction, back EMF magnitude, and back EMF phase angle. During normal motor operation, adequate assumptions about these parameters can often be made based on the control that is implemented (e.g., if particular speed is commanded in an open loop control scheme, it is often adequate to assume that the control scheme is maintaining the actual motor speed at the commanded speed). However, situations exist in which such assumptions are not adequate. This is the case, for example, when a motor drive becomes disconnected from a motor (meaning that the power supply to the motor is interrupted, not necessarily that the electrical connection between the motor drive and the motor is interrupted) and open loop control is no longer present. In this case, with no control present, it is difficult to make any assumptions about these parameters.

There are a variety of reasons why a motor drive may become disconnected from a motor. For example, there may be a sudden temporary power loss at the power source that supplies power to the motor and motor drive. Alternatively, it may simply be the case that there are times when it is not necessary to operate the motor, and so power is not supplied to the motor during these times.

The fact that the motor drive is disconnected from the motor does not prevent the motor from continuing to rotate. For example, if the motor is used in conjunction with a fan in an air conditioning system, a draft in the air conditioning system may drive the motor at an unknown speed and in an unknown direction. Similarly, if the motor is used in a conveyor system, the force of gravity acting on the motor by way of the conveyed articles and friction may drive the motor at an unknown speed and in an unknown direction.

When a motor drive becomes disconnected from a motor, it eventually becomes necessary to reconnect the motor drive to the motor. In order to perform the reconnection, it is desirable to determine the above-mentioned parameters, namely, rotor speed, rotor direction, back EMF magnitude and/or back EMF phase angle, before the motor drive is reconnected to the motor. Measuring these parameters is desirable because it allows the motor drive to be synchronized to the motor, thereby reducing transients at the moment of reconnection. For example, if the speed of the motor is not determined before reconnection, then the motor drive must assume an initial speed of zero when reconnecting to the motor. This often results in severe transients due to the difference between the frequency of the applied voltage and the frequency of the motor-induced back EMF. The transients are especially severe when the initial motor speed is high and when the motor is rotating in a reverse direction as compared to that commanded by the motor drive. If the current control circuitry or current limiting circuitry of the motor drive is not fast enough, the motor drive can fault due to an overcurrent condition. Additionally, when the motor operates as a generator (that is, when the frequency of the voltage applied to the motor is less than the motor speed), then the DC bus voltage may increase to unacceptable levels and cause damage to the power switches in the motor drive.

It is therefore desirable to determine the rotor speed, rotor direction, back EMF magnitude and back EMF phase angle to allow the motor drive to be synchronized to the motor when the motor drive is reconnected and thereby to reduce transients upon reconnection. Additionally, when performing a reconnection, it is desirable to measure these parameters in as little time as possible so that operation may continue as smoothly as possible to make the temporary disconnection as imperceptible as possible.

SUMMARY OF THE INVENTION

According to a preferred aspect of the invention, a method of reconnecting a motor to a motor drive comprises controlling a current which flows through the motor using a current regulator. The current regulator produces a voltage command output based on a current command input. A current is commanded at the current command input of the current regulator. Back EMF measurements are acquired at different instants in time by monitoring the voltage command output of the current regulator. Back EMF phase angles are determined for a plurality of the instants in time based on a respective plurality of the back EMF measurements. A frequency of the back EMF is determined based on the back EMF angles determined for the plurality of instants in time. The motor drive is reconnected to the motor based on the frequency of the back EMF.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF PREFERRED EMBODIMENTS

Figure 1:
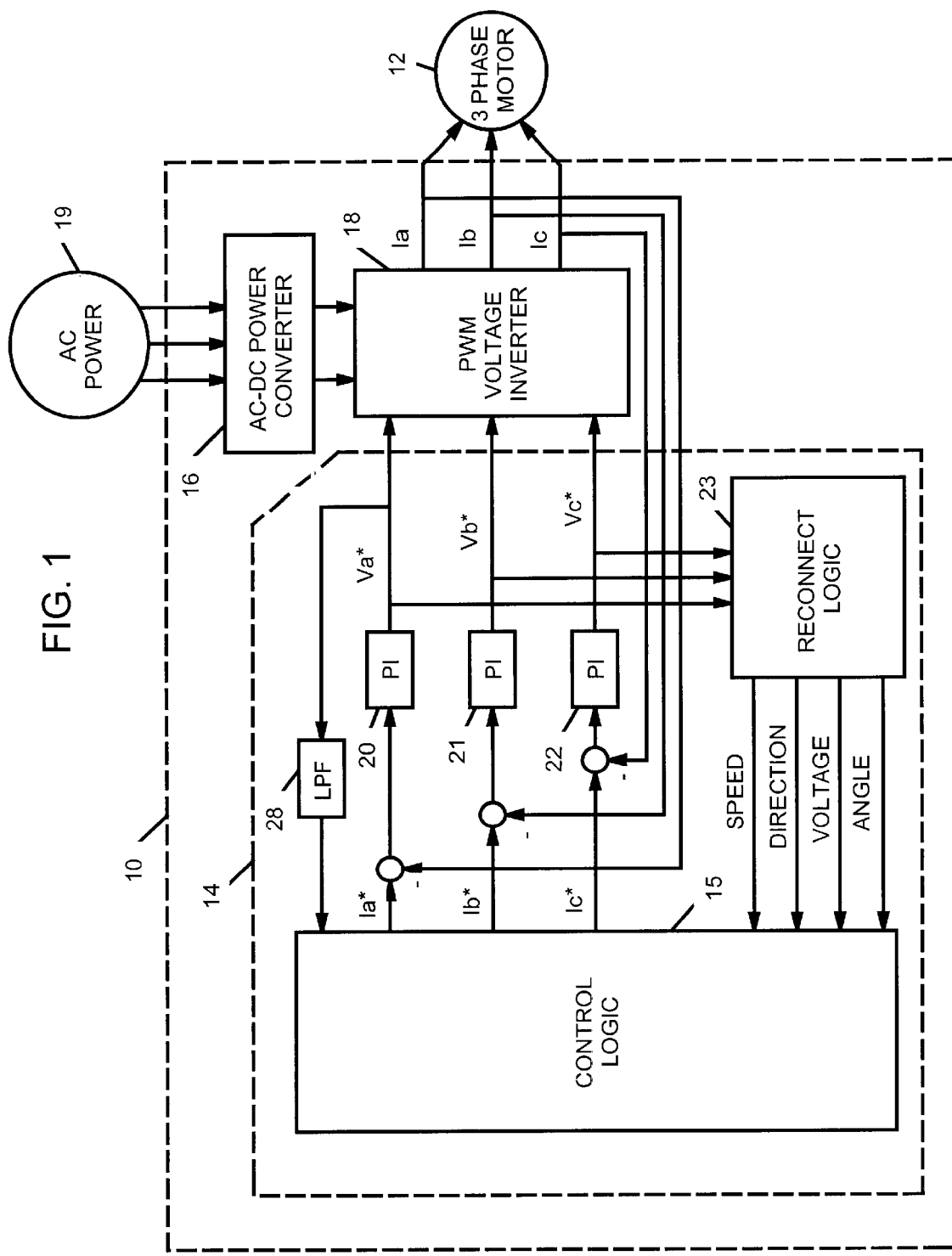
FIG. 1 is a block diagram of a motor drive that is capable of determining the rotating speed, rotating direction, back EMF magnitude, and back EMF phase angle of a motor that has been disconnected from the motor drive.

Referring now to FIG. 1, a block diagram of a motor drive 10 which drives an electric motor 12 is illustrated. The motor drive 10 includes a control system 14, an AC to DC power converter 16, and a PWM (Pulse Width Modulation) voltage inverter 18. The control system 14, the power converter 16 and the voltage inverter 18 cooperate so as to drive the motor 12 using power supplied by a three phase AC power source 19.

The control system 14 regulates the current through the motor 12 by generating voltage commands Va*, Vb* and Vc* based on current commands Ia*, Ib* and Ic*. (Herein, lower case letters a, b and c denote phase A, phase B, and phase C, respectively, and a superscripted asterisk denotes a "command" signal.) Of course, since current and voltage are directly related, the fact that current is controlled means that voltage is simultaneously also controlled, and vice versa.

The control system 14 is implemented in firmware executed by a microprocessor. The control system 14 includes a controller 15 which generates the current commands Ia*, Ib* and Ic*. During normal connected operation, the controller 15 generates the commands Ia*, Ib* and Ic* based on a speed command received at a user input (not illustrated). While the motor drive 10 is reconnecting to the motor 12, the controller 15 generates the commands Ia*, Ib* and Ic* in a manner which is described in greater detail below in conjunction with FIGS. 2–7.

The control system 14 includes three current regulators 20, 21 and 22 which are respectively formed of PI (proportional-integral) feedback control loops and which control the flow of actual motor currents Ia, Ib and Ic based on the current commands Ia*, Ib* and Ic*, respectively. Current feedback signals for the current regulators 20, 21 and 22, respectively, are provided by current sensors associated with the motor 12. Although in FIG. 1 there is a one-to-one correspondence between the current regulators and the phases of the motor 12, and the current regulators 20, 21, and 22 operate in the stator reference frame, other arrangements could also be used. For example, a two phase (d-q) current regulator that operates to control the currents Id and Iq through the motor (either in the stator or rotor reference frame) could be used.

The outputs of the current regulators 20, 21 and 22 are the voltage commands Va*, Vb* and Vc*. The voltage commands Va*, Vb* and Vc* are received by the PWM voltage inverter 18, which generates PWM control signals based on the voltage commands Va*, Vb* and Vc*. The PWM voltage inverter 18 includes a network of six solid state switches (not illustrated) which are switched on and off in accordance with the PWM control signals. The solid state switches convert the low power PWM control signals to high power current pulses to drive the motor 12 using power supplied by the three-phase AC source 19 via the AC-DC power converter 16. The PWM voltage inverter 18 also includes a conventional PWM dead time compensation circuit (not illustrated) to compensate for the dead time necessary between PWM pulses to prevent short circuiting the power supply.

The control system 14 also includes reconnect logic 23. The reconnect logic 23 is a system which receives the voltage commands Va*, Vb* and Vc* from the current regulators 20–22, and performs calculations to determine the back EMF frequency (and thereby the rotor speed), rotor direction, back EMF magnitude, and back EMF phase angle. As will become apparent below, the preferred reconnect process of FIG. 2 utilizes not only the reconnect logic 23, but also the controller 15, and the current regulators 20–22 to reconnect the motor drive 10 to the motor 12. Additionally, during the preferred reconnect process, the voltage command Va* provides voltage feedback that is used to establish a positive feedback control loop. In FIG. 1, the voltage command Va* passes through a low pass filter 28 to reduce ripple voltage.

Figure 2:
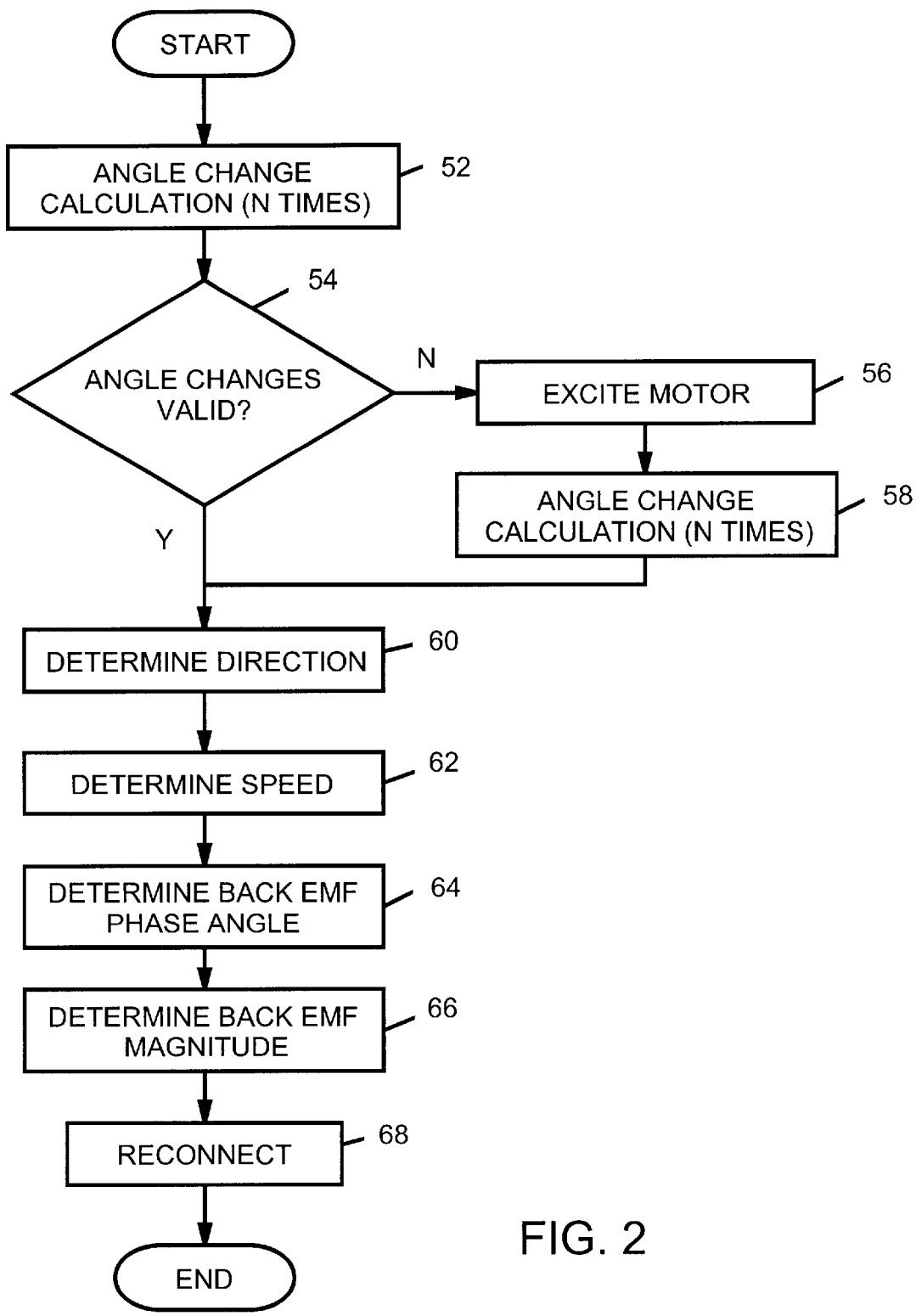
FIG. 2 is a flowchart describing the operation of the motor drive illustrated in FIG. 1 to reconnect to the motor.

Referring now to FIG. 2, a flowchart describing the operation of the motor drive 10 to reconnect to the motor 12 is illustrated. Initially, it is assumed that the motor drive 10 has been disconnected from the motor 12 meaning, for example, that the transistors in the inverter 18 continually remain in an "off" state. The speed and direction of rotation of the motor 12, as well as the amount of time that the motor drive 10 has been disconnected, are assumed to be unknown. For certain types of motors, for example, large induction motors, it is also desirable to determine the back EMF magnitude and the back EMF phase angle. Therefore, it is assumed that these parameters are unknown as well.

Figure 3:
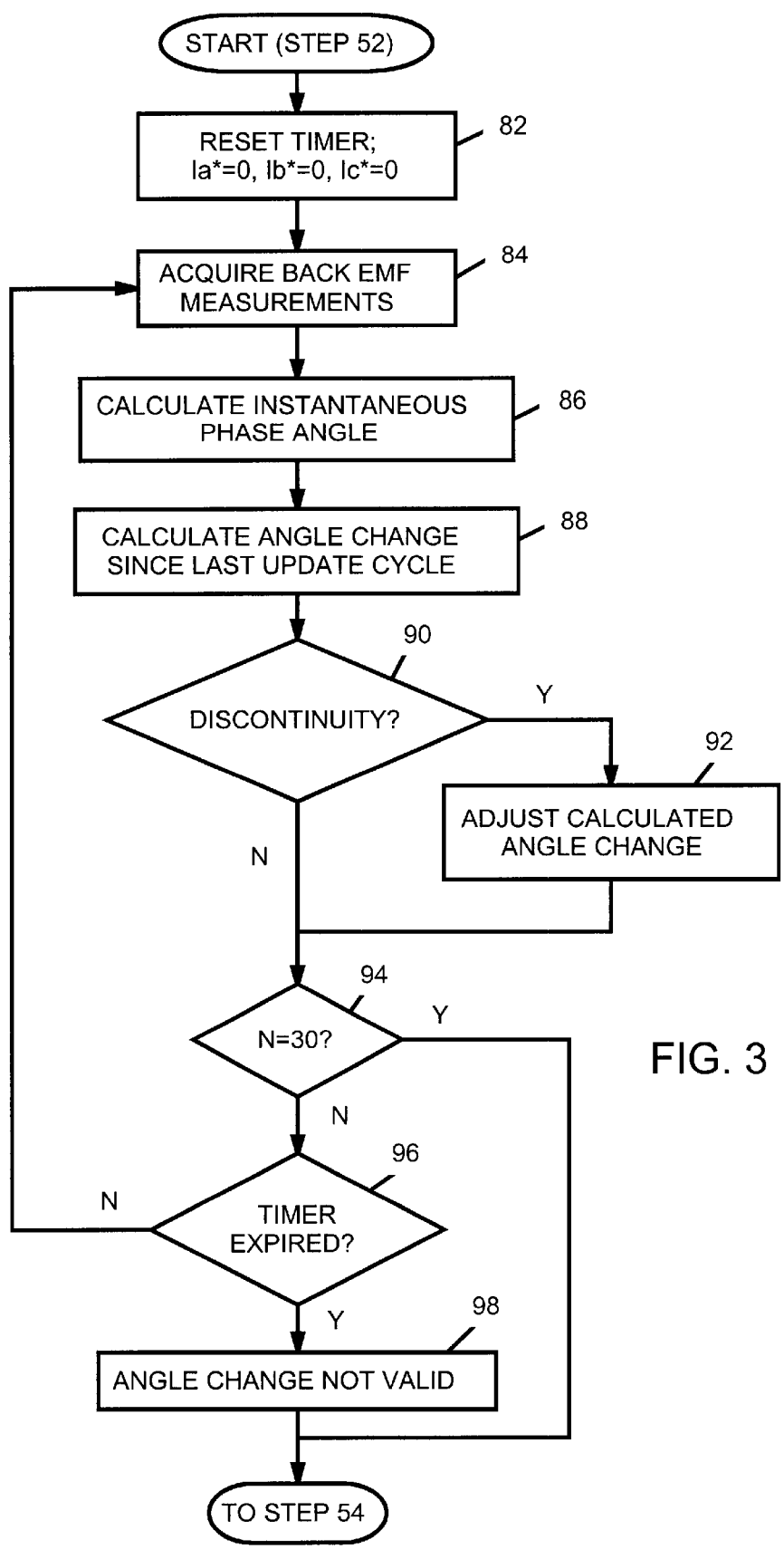
FIG. 3 is a flowchart describing one of the steps in the flowchart of FIG. 2 in greater detail.

At step 52, the change in the phase angle of the back EMF during a predetermined number of sample instants is determined. Reference is now also made to FIG. 3, which shows step 52 in greater detail. At step 82, the current regulators 20, 21 and 22 are initialized by setting the current commands Ia*, Ib* and Ic* equal to zero, thereby commanding a current of zero amperes in each of the three phases of the motor 12. This allows the resultant voltage commands Va*, Vb* and Vc* to be monitored to determine the actual motor induced voltages (back EMF) Va, Vb and Vc. Specifically, when the current commands Ia*, Ib* and Ic* are set equal to zero, the control system 14 determines the voltage commands Va*, Vb* and Vc* such that the voltage commands Va*, Vb* and Vc* are an exact image of the actual motor voltages Va, Vb and Vc. Any difference implies a current flow, and this is (at least substantially) prevented by the current regulators 20, 21 and 22 because the current commands Ia*, Ib* and Ic* are set equal to zero. Using the voltage commands Va*, Vb* and Vc* in this way allows measurements of the actual motor voltages Va, Vb and Vc to be acquired without using separate hardware to perform the measurements.

In addition to current commands Ia*, Ib* and Ic* which command a current of zero, other current commands could be used. No current, or at least a DC current, is especially well-suited for use because the frequency component of the resulting voltage command Va*, Vb* and Vc* is entirely attributable to the speed of the motor 12. However, any current command which allows the actual motor voltages to be determined based on the resulting voltage commands may be used. The type of current command used will depend in part upon the type of current regulator used.

At step 84, the back EMF measurement is acquired. As indicated by the above discussion in connection with step 82, step 84 is performed when the voltage commands Va*, Vb* and Vc* are determined by the firmware that implements the control system 14 pursuant to the operation of the current regulators 20–22 and are thereafter available for use within the firmware. At step 86, the instantaneous phase angle of the back EMF is determined and, at step 88, the angle change since the last update cycle is calculated. The following equations provide a background understanding of an exemplary technique for performing steps 86 and 88. First, it is assumed that the back EMF voltages have the following form:

$$Va = V\sin(\omega t + \phi(0)) = V\sin\phi \tag{1a}$$

$$Vb = V\sin\left(\omega t - \frac{2\pi}{3} + \phi(0)\right) = V\sin\left(\phi - \frac{2\pi}{3}\right) \tag{1b}$$

-continued $$Vc = V\sin\left(\omega t + \frac{2\pi}{3} + \phi(0)\right) = V\sin\left(\phi + \frac{2\pi}{3}\right) \quad (1c)$$

where Va, Vb and Vc are the back EMF for phases A, B and C, respectively, V is the magnitude of the back EMF, ω is back EMF frequency, t is time, φ is the phase angle of the back EMF at time t, and φ(0) is the initial phase angle corresponding to the time zero (t=0) value of the instantaneous current. For simplicity, it is assumed herein that φ(0)=0 (so that the φ(0) term need not be included in subsequent equations) and that the motor 12 is a two pole motor.

Applying Park's transformation, the voltages of Eqs. (1a)–(1c) can be transformed from a three-phase (a-b-c) system to a two-phase orthogonal (d-q) system as follows:

$$Vq = Va = V\sin\phi \quad (2a)$$

$$Vd = \frac{(Vc - Vb)}{\sqrt{3}} = V\cos\phi \quad (2b)$$

In Eqs. (2a) and (2b), the two-phase (d-q) system is defined with respect to the stator reference frame. Dividing Eq. (2a) by Eq. (2b) yields the following equation:

$$\frac{Vq}{Vd} = \frac{V\sin\phi}{V\cos\phi} = \tan\phi \quad (3)$$

Eq. (3) can be rewritten to yield the following equation:

$$\phi = \tan^{-1}\frac{Vq}{Vd} \quad (4)$$

Substituting Eqs. (2a)–(2b) into Eq. (4), and substituting the voltage commands Va*, Vb* and Vc* for the actual motor voltages Va, Vb and Vc, allows Eq. (4) to be rewritten as follows:

$$\phi = \tan^{-1}\left(\frac{Va^*\sqrt{3}}{Vc^* - Vb^*}\right) \quad (5)$$

In Eq. (5), the back EMF measurements for the motor voltages Vb and Vc are compared to determine the difference between these voltages, the difference between the motor voltages Vb and Vc is compared with the remaining motor voltage Va, and an arctangent function is applied to the resultant ratio. The trigonometric relationship of Eq. (5) expresses the back EMF phase angle as a function of the commands Va*, Vb* and Vc*, which are known parameters within firmware at any given sample instant.

The change in the phase angle is equal to the difference between the phase angle at the start of a measurement interval and the phase angle at the end of a measurement interval.

$$\Delta\phi = \phi_{end} - \phi_{start} \quad (6)$$

As will be detailed below, the change in the phase angle is preferably calculated multiple times using data acquired at different consecutive sample instants N, where N is an integer. The sample instants N occur at instants in time that may occur, for example, at fixed intervals once per update cycle of the firmware that implements the control system 14.

Equations (5)–(6) are rewritten below to reflect the fact that the calculations of Eqs. (5)–(6) are performed at particular sample instants N:

$$\phi_N = \tan^{-1}\left(\frac{Va_N^*\sqrt{3}}{Vc_N^* - Vb_N^*}\right) \quad (7)$$

$$\Delta\phi_N = \phi_N - \phi_{N-1} \quad (8)$$

Thus, to calculate the instantaneous phase angle as set forth in step 86, the reconnect logic 23 calculates the arctangent function set forth in Eq. (7). To calculate the angle change since the last update cycle as set forth in step 88, the reconnect logic 23 calculates the difference set forth in Eq. (8). For example, for the sample instant N=1, the instantaneous phase angle of the back EMF and the angle change may be calculated as follows:

$$\phi_1 = \tan^{-1}\left(\frac{Va_1^*\sqrt{3}}{Vc_1^* - Vb_1^*}\right) \quad (9)$$

$$\Delta\phi_1 = \phi_1 - \phi_0 \quad (10)$$

where $\phi_0$ is the phase angle of the back EMF calculated in accordance with Eq. (7) for an initial sample interval (N=0). The technique embodied in Eqs. (7) and (8) is the preferred technique for determining the back EMF phase angle, however, it should be apparent that other techniques could also be used to determine the back EMF phase angle based on one or more back EMF measurements.

At step 90, it is determined whether a discontinuity occurred during the previous update cycle. As indicated by Eq. (7) above, the instantaneous phase angle is calculated using an arctangent function. However, arctangent is by nature a cyclic function that produces an output which ranges between ±90°. Since the signs of the input values to Eq. (7) are known and can be taken into account, the output range of Eq. (7) can be further extended to ±180°. To further extend the range, the discontinuities which occur at the limits of the output range may also be taken into account. To this end, the following function is utilized:

$$\Delta\phi = \begin{cases} \Delta\phi & \text{if } |\Delta\phi| \le \phi_{max} \\ \Delta\phi - 360 & \text{if } |\Delta\phi| > \phi_{max} \text{ and } \Delta\phi > 0 \\ \Delta\phi + 360 & \text{if } |\Delta\phi| > \phi_{max} \text{ and } \Delta\phi < 0 \end{cases} \quad (11)$$

where $\Delta\phi_{max}$ is a predetermined maximum angle change.

Figure 4:
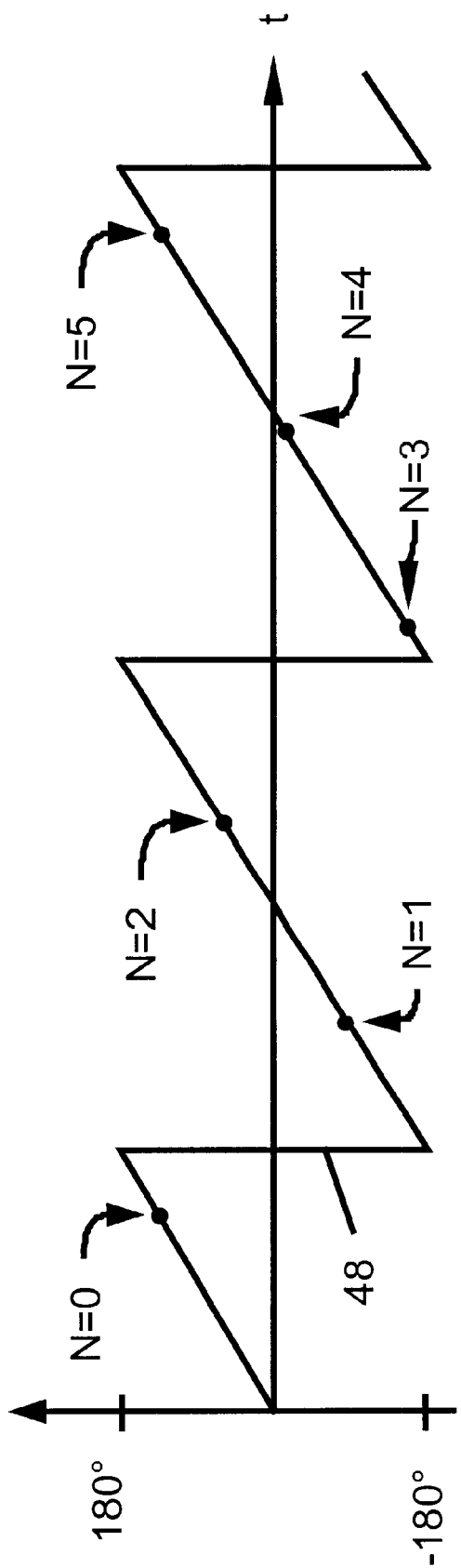
FIG. 4 is an exemplary data set acquired during the performance of the process of FIG. 2.

Reference is now made to FIG. 4 and Table 1, which explain the operation of Eq. (11) in greater detail. FIG. 4 and Table 1 show an exemplary data set acquired during the process of FIG. 3, in which the voltage command outputs of the current regulators 20, 21, 22 are monitored and six phase A back EMF measurements ($Va_0$ to $Va_5$), six phase B back EMF measurements ($Vb_0$ to $Vb_5$), and six phase C back EMF measurements ($Vc_0$ to $Vc_5$) are acquired at different sample instants N=0 to N=5, respectively. FIG. 4 shows a curve 40 that would be the output of Eq. (7) (modified to take into account the signs of the input values) if Eq. (7) were continuously updated rather than updated only at the discrete sample instants N=0 to N=5. Table 1 shows the back EMF phase angles $\phi_0$ to $\phi_5$ determined at the sample instants N=0 to N=5 based on the three sets of respective multiple back EMF measurements $Va_0$ to $Va_5$, $Vb_0$ to $Vb_5$, and $Vc_0$ to Vc$_5$, with these sample instants also being shown on curve 45.

TABLE 1

Exemplary Data Set

| Sample Instant (N) | Back EMF Phase Angle ($\phi_N$) | Uncorrected Change in Phase Angle ($\Delta\phi_N$) | Corrected Change in Phase Angle ($\Delta\phi_N'$) |
|---|---|---|---|
| N = 0 | 130 | — | — |
| N = 1 | −87 | −217 | 143 |
| N = 2 | 53 | 140 | 140 |
| N = 3 | −159 | −212 | 148 |
| N = 4 | −16 | 143 | 143 |
| N = 5 | 128 | 144 | 144 |

It is seen in FIG. 4 that the measurements at the sample instants N=1 and N=2 occur during a common half cycle of the back EMF, and the measurements at the sample instants N=3, N=4 and N=5 occur during another common half cycle of the back EMF. However, the back EMF phase angles at the sample instants N=0 and N=1 are separated by a 360° discontinuity, as are the back EMF phase angles at the sample instants N=2 and N=3. If the predetermined maximum angle change $\Delta\phi_{max}$ is set at 180°, then it is known that any angle change less than 180° is a correct angle change and any angle change greater than 180° is due to a 360° discontinuity. However, this determination assumes that the speed of the motor is less than a predetermined maximum speed. For example, if the firmware that implements the control system 14 has an update cycle of 250 μs and the predetermined maximum angle change is 180°, then the predetermined maximum speed that can be measured according to this example is 2000 Hz (that is, $$\frac{0.5 \text{ cycle}}{0.00025 \text{ s}}\text{)}.$$

Thus, if the motor 12 is rotating at less than the predetermined maximum speed (in this case, 2000 Hz), and an angle change having a magnitude greater than 180° is detected during a single 250 μs update interval, then it is determined that this angle change must be the result of a 360° discontinuity. On this basis, according to Eq. (11), the angle change value $\Delta\phi_N$ produced by the initial angle change calculation is adjusted by 360° (which is either added or subtracted, depending on the direction of rotation) to account for the 360° discontinuity. Steps 90 and 92 of the flowchart of FIG. 3 are therefore in practice implemented through the operation of Eq. (11). The rightmost column of Table 1 shows how the angle change values are adjusted by Eq. (11) to adjust for a 360° discontinuity when appropriate. If there is no discontinuity, then the angle change value $\Delta\phi_N$ calculated at step 88 is not adjusted.

In practice, it is desirable to have the predetermined maximum angle change $\Delta\phi_{max}$ be less than 180°, and preferably less than 150° (for example, 90° or 120°) to provide additional margin for measurement error. At the same time, it is desirable to have as short a time interval between sample instants as possible in order to make the maximum speed that can be measured as large as possible. The maximum speed that can be accurately measured is given by the following equation:

$$f_{\max} = \frac{\Delta\phi_{\max}}{2\pi t_{sample}} \quad (12)$$

where $f_{max}$ is the maximum speed that can be measured, $\Delta\phi_{max}$ is the predetermined maximum angle change, and $t_{sample}$ is the time between consecutive sample instants (e.g., 250 μs in the above example). It is seen from Eq. (12) that as the time $t_{sample}$ decreases, the maximum speed that can be accurately measured increases. However, the time $t_{sample}$ should not be so small that any rotor movement which occurs is too small to be discernable by the process of FIG. 3. In practice, therefore, the time $t_{sample}$ may be chosen as a function of the speed that is desired to be measured as well as the capabilities of the microprocessor employed to implement the control system 14. Additionally, it may be desirable in some instances to vary the time $t_{sample}$ during the operation of the control system 14. For example, the time $t_{sample}$ may be set equal to 250 μs when higher speeds are measured and may be set equal to 500 μs when lower speeds are measured.

At step 94, it is determined whether all of the samples have been acquired. As previously noted, the change in the phase angle is calculated a number of times using back EMF measurements acquired during consecutive sample instants N. In the most preferred embodiment, the change in the phase angle is calculated thirty times (N=1 to N=30). The process of FIG. 3 is preferably performed once per update cycle of the firmware that implements the control system 14, and the sample instants are preferably separated by fixed time intervals. For example, if the update cycles occur at 250 μs intervals, then thirty-one samples (N=0 to N=30) may be acquired in 7.75 ms. The process of FIG. 3 will be repeated at the next update cycle until the angle change has been calculated the predetermined number of times (i.e., in the illustrated embodiment, thirty times).

It may be noted that, at step 94, it is not only determined whether all of the samples have been acquired, but also whether the samples are valid. If the residual back EMF in the motor 12 is too low, then the back EMF measurements will be primarily the result of noise and valid results will not be produced. This may be the case, for example, where an induction motor or a reluctance motor is used and the residual back EMF has decayed significantly.

To determine whether valid results have been produced, the angle change values $\Delta\phi_1'$ to $\Delta\phi_N'$ are compared with each other to ensure that the results appear valid when viewed over multiple intervals. For example, the angle change values $\Delta\phi_1'$ to $\Delta\phi_N'$ may be compared to determine whether a predetermined number of the angle changes are not in the same direction as remaining ones of the angle changes (e.g., whether all of the angle change values are in the same direction). Alternatively, the angle change values $\Delta\phi_1'$ to $\Delta\phi_N'$ may be compared to determine whether the angle changes are of generally the same magnitude. If a timer at step 96 expires before a sequence of N valid samples is acquired, then it is assumed that the angle change values are not valid and therefore that valid results have not been produced (step 98).

The timer should be set to expire after a period of time that is larger than the amount of time required to acquire the samples. For example, if 7.75 ms is required to acquire the samples, then the timer may be set to expire after 10 ms. If a value of 10 ms is used, then this implies that about 40 samples are acquired before the timer expires (40 samples× 250 μs per sample=10 ms). Therefore, requiring that thirty of the angle change values be in the same direction requires that 75% of the angle change values be in the same direction. The fact that 75% of the angle change values are in the same direction makes it unlikely that the back EMF measurements are the result of noise. Of course, higher or lower percentages could also be used.

Referring back to FIG. 2, after the angle change calculation step 52 is complete, the process proceeds to step 54. At step 54, if the back EMF measurements used in the angle change calculations in step 52 are determined at step 98 to be valid back EMF measurements, then the process proceeds to step 60. Alternatively, if the back EMF measurements are determined at step 98 to be invalid back EMF measurements, then the process proceeds to step 56.

At step 56, the motor 12 is excited in order to induce a back EMF. To excite the motor 12, the windings are provided with current by generating the current command input for the current regulators 21 and 22 as a function of the voltage command output Va*, which is the output of the current regulator 20. Specifically, the following current commands are provided to the current regulators 20, 21 and 22:

$$Ia^* = 0 \quad (13a)$$

$$Ib^* = Kdir \times Kg \times Va^* \quad (13b)$$

$$Ic^* = -Kdir \times Kg \times Va^* \quad (13c)$$

where Kdir is a constant determined in accordance with the direction of rotation of the motor 12 and Kg is a gain constant determined such that the current provided to the motor 12 is within the rated current limits of the motor 12. The motor voltages Va, Vb and Vc are assumed to be defined such that the motor voltage Va is in phase with the field producing current Id when the motor 12 is rotating in the forward direction (or 180° out of phase with the field producing current Id when the motor 12 is rotating in the reverse direction). Therefore, since the motor voltage Va and the field producing current Id are in phase, the Va* term causes the commanded current to be field-producing current. As a result, field producing current is provided to the phase B and C windings, thereby causing the flux in the motor 12 to increase and therefore causing the back EMF measured at the phase A winding to increase. The direction constant Kdir is set to +1 or −1 to ensure that the commanded current has the correct phase (as opposed to being 180° out of phase) depending on the direction of rotation of the motor 12. The gain constant Kg is used to control the magnitude of the current commands Ib* and Ic* such that the amount of field producing current provided to the motor 12 decreases as flux builds up in the motor 12.

Figure 5:
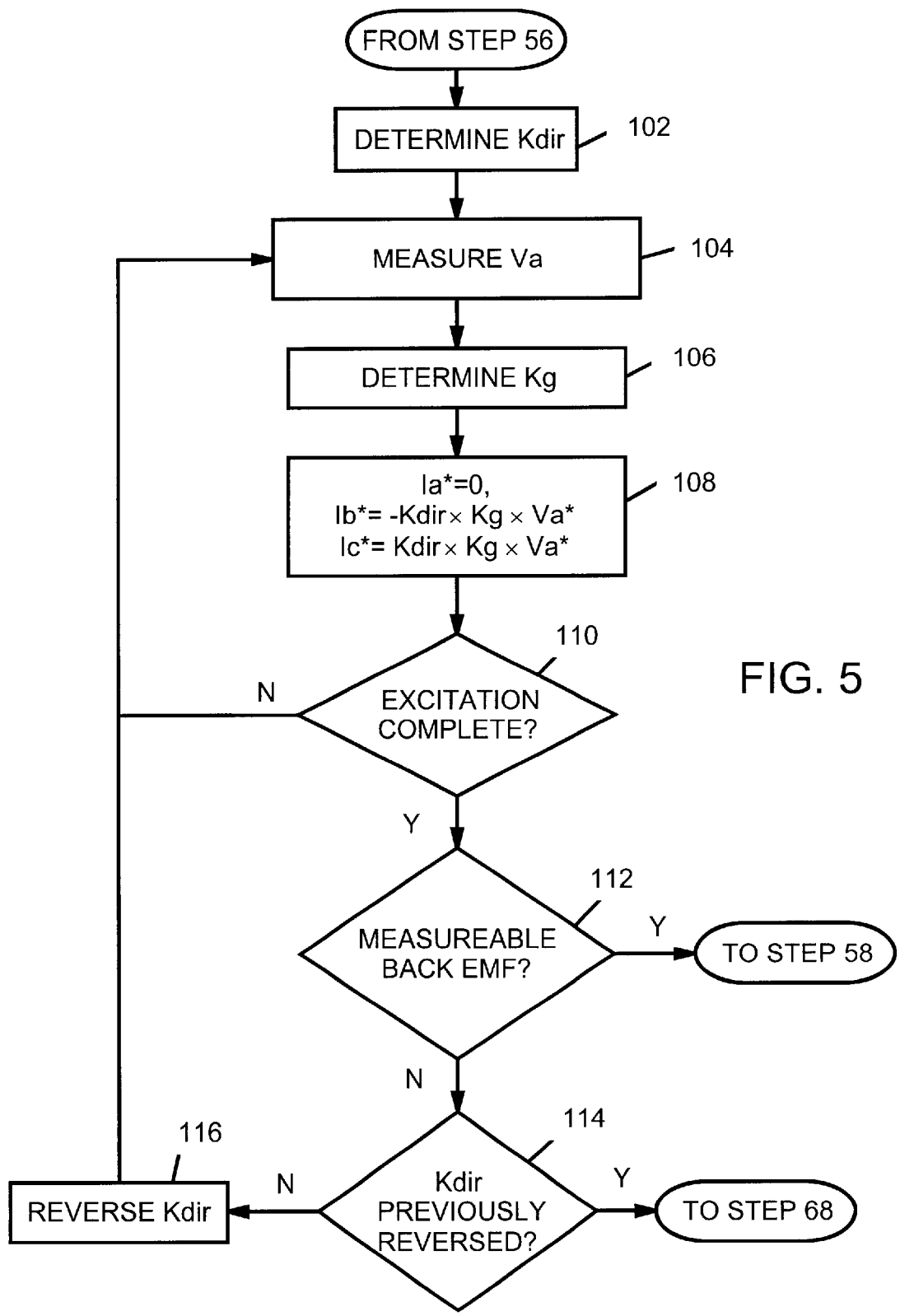
FIG. 5 is a flowchart describing another one of the steps in the flowchart of FIG. 2 in greater detail.

Step 56 is shown in greater detail in FIG. 5. First, at step 102, the direction constant Kdir is determined. The direction constant Kdir is preferably defined as follows:

$$Kdir = \begin{cases} 1 & \text{if motor is rotating in forward direction} \\ -1 & \text{if motor is rotating in reverse direction} \end{cases} \quad (14)$$

Whether the motor 12 is rotating in the forward or reverse direction may be determined based on the residual back EMF in the motor 12. Typically, even when the residual back EMF is not large enough to permit valid results to be produced at step 52, it is still large enough to at least determine the direction of rotation of the motor 12. For example, in Table 1, if the sum of the values in the rightmost column is positive then the motor 12 is rotating in the forward direction, otherwise, the motor 12 is rotating in the reverse direction. If the direction of rotation of the motor 12 cannot be determined from the back EMF measurements, then the constant Kdir may be set to either +1 or −1 based on other criteria, for example, the direction of rotation prior to disconnection or the desired direction of rotation after reconnection is complete. It may be noted that if the direction constant Kdir is improperly set, then flux will not build up in the motor 12. As detailed below, if flux does not build up in the motor 12 after a predetermined amount of time, then the constant Kdir is reversed and a second attempt is made to excite the motor 12.

At step 104, the motor voltage Va is measured as previously described (namely, by ascertaining the value of the voltage command Va* in firmware). At step 106, the gain constant Kg is determined. The gain constant Kg is preferably calculated in accordance with the following equation:

$$Kg = \begin{cases} \dfrac{I_{max}}{Va^*_{RMS}} \times \dfrac{V_{BUS\_LIMIT} - V_{BUS}}{V_{BUS\_LIMIT} - V_{BUS\_INIT}} & \text{if } V_{BUS\_LIMIT} > V_{BUS} \\ 0 & \text{if } V_{BUS\_LIMIT} \leq V_{BUS} \end{cases} \quad (15)$$

where $V_{BUS\_LIMIT}$ is the bus voltage limit (predetermined according to firmware), $V_{BUS}$ is the instantaneous bus voltage feedback, $V_{BUS\_INIT}$ is the bus voltage feedback at the start of excitation, $Va^*_{RMS}$ is the RMS (root mean squared) value of the voltage command Va*, and $I_{max}$ is the motor rated current.

From Eq. (15) it is seen that the gain constant Kg is determined by the motor voltage Va and the DC bus voltage. The DC bus voltage tends to rise as the motor flux builds up. The gain constant Kg is determined such that, initially, the motor 12 is provided with the maximum rated motor current, thereby causing the flux to build as quickly as possible. Thereafter, the gain constant Kg decreases as flux builds up even if the bus voltage does not change. Once the gain constant Kg reaches zero, excitation is complete even if the predetermined exciting time is not used up.

At step 108, after the parameters Kdir, Va*, and Kg have been determined, the controller 15 provides current commands Ia*, Ib*, and Ic* to the current regulators 20, 21, and 22 in accordance with Eqs. (13a)–(13c). Once the excitation begins, the excitation is allowed a predetermined amount of time to build up flux in the motor 12. The predetermined amount of time may be determined as a function of the motor electrical time constant (the ratio of motor resistance and inductance) and/or other parameters. At step 110, excitation terminates when the predetermined amount of time expires or until the gain constant Kg decreases to zero, whichever occurs first.

At step 112, it is determined whether measurable back EMF is being produced. If measurable back EMF is being produced, then excitation is complete and the process proceeds to step 58 (FIG. 2). However, if measurable back EMF is not being produced, then the process proceeds to step 114. If the direction constant Kdir is improperly set, or if the motor 12 is not rotating, then flux will not build up in the motor 12 and measurable back EMF not be produced.

At step 114, it is determined whether the direction constant Kdir has already been reversed. If not, then at step 116 the direction constant Kdir is reversed (that is, changed from +1 to −1 or vice versa). The process then proceeds to step 104 where a second attempt to excite the motor 12 using the new direction constant Kdir is made. After the direction constant has already been reversed once, at step 114, it is assumed that the motor 12 is not rotating or is rotating at a speed that is too low to detect. Assuming one electrical cycle is represented using ten bits, then the lowest speed that can be detected in this embodiment is about 2.9 Hz (i.e., $$\frac{30}{.01 \times 1024}).$$

Therefore, the process proceeds to step 68 (FIG. 2). In this case, the motor drive 10 is reconnected using zero speed initial conditions and started from zero speed in conventional fashion. (For simplicity, it is assumed in FIG. 2 that reconnection proceeds by way of steps 60–66, and therefore a connection from step 58 directly to step 68 is not shown.)

Referring back to FIG. 2, at step 58, the angle change is recalculated after the motor has been excited. Step 58 may be performed in the same manner as step 52, as described above in connection with FIG. 3. At step 60, the direction of rotation is determined. As will be recalled, at step 88, the back EMF phase angle determined at a given sample instant is compared with the back EMF phase angle determined at a previous sample instant. The direction of rotation is determined by examining the angle change values produced by Eq. (8) at step 88 or, when appropriate, the adjusted angle change values produced by Eq. (11) at step 92. If the angle change values are positive ($\Delta\phi_{TOT}>0$, where $\Delta\phi_{TOT}$ is the total angle change), then this corresponds to rotation in the forward direction. (In practice, the total angle change $\Delta\phi_{TOT}$ may be calculated by summing the individual angle changes calculated for each sample interval, represented by the rightmost column in Table I.) If the angle change values are negative ($\Delta\phi_{TOT}<0$), then this corresponds to rotation in the reverse direction.

At step 62, the rotor speed is determined. The frequency of the back EMF is equal to the electrical frequency (electrical speed) of the motor. If it is desired to convert the electrical speed parameter to a mechanical speed parameter, the electrical speed can be multiplied by 2N, where N is the number of motor poles. For an induction motor, the speed of the motor is equal to the frequency of the back EMF minus the slip frequency.

The frequency of the back EMF is determined based on the back EMF angles determined at the sample instants N=0 to N=30. In particular, the back EMF frequency o is determined by determining an angular difference $\Delta\phi_{TOT}$ between the first back EMF phase angle $\Delta\phi_0$ and the last back EMF phase angle $\Delta\phi_{30}$, determining the temporal difference $\Delta t_{TOT}$ between the first sample N=0 and the last sample N=30, and then determining the frequency of the back EMF as a function of the angular difference $\Delta\phi_{TOT}$ and the temporal difference $\Delta t_{TOT}$. This is summarized by Eqs. (16)–(17) below.

$$\Delta\phi_{TOT}=\phi_N-\phi_0=\omega t_N-\omega t_0=\omega^*\Delta t_{TOT} \tag{16}$$

$$\omega = \frac{\Delta\phi_{TOT}}{\Delta t_{TOT}} \tag{17}$$

where $\omega$ is the frequency of the back EMF, $\Delta\phi_{TOT}$ is the total angle change and $\Delta t_{TOT}$ is the total elapsed time between the initial and the final sample instants. The units of the determined speed may be converted to Hertz by dividing the result of Eq. (17) by $2\pi$.

Eq. (17) is preferably implemented using the same data set that was used in step 52, or by using additional data points if improved accuracy is desired. In this regard, it may be noted that the accuracy of the speed measurement increases as the number of samples upon which the speed measurement is based increases. For example, if measuring at a speed of 60 Hz with 250 $\mu s$ update cycles, the angle change per sample is 5.4°. Assuming that the back EMF phase angle is digitized using ten bit quantization (360°÷1024=0.35° resolution), then the quantization error is 0.35°. For two samples, the total angle change is 10.8° and the maximum total error is 0.70° (0.35° for each sample) or 13.0%. For thirty samples, the angle change in 30×250 $\mu s$=7.5 ms is 162°. The maximum total error remains at 0.70° since internal errors cancel and only errors in the first and last samples do not cancel. For thirty samples, therefore, the error is only 0.43%. It is therefore seen that accuracy improves when multiple samples are utilized because the angle changes are accumulated and the maximum total error (0.70° in the above example) is spread out over a greater total angle change. Thus, although the process described above could be performed using only two samples (or even one if the initial phase angle is known), it is preferable to use additional samples to decrease error. In this regard, it may be noted that the time required to acquire the additional samples is quite small relative to the speed of the motor 12, and therefore it is still possible to reconnect the motor 12 quite rapidly.

In the preferred embodiment, the back EMF frequency co is determined by determining the back EMF phase angle $\phi$ for all of the sample instants, and then determining the frequency $\omega$ based on the summation of the total change in the phase angle $\phi$ between the first and last sample instants. However, it is possible to determine the back EMF frequency $\omega$ based only on a subset of the back EMF measurements that are acquired, for example, if another arrangement is used to obtain a coarse speed measurement and the method described herein is used to provide a fine speed measurement that is based in part on the coarse speed measurement.

At step 64, the back EMF phase angle is determined. The back EMF phase angle is simply the phase angle $\Delta\phi_N$, that is, the phase angle calculated at step 86 using the most recent data set available in Eq. (7). For example, if N=30 is the most recent sample instant, then the back EMF phase angle is the phase angle $\Delta\phi_{30}$.

At step 66, the back EMF magnitude is determined. The back EMF magnitude is preferably determined according to the following equation:

$$V = \sqrt{Vq_N^2 + Vd_N^2} \tag{18}$$

For example, if N=30 is the most recent sample instant, then the back EMF magnitude may be determined according to the following equation:

$$V = \sqrt{Vq_{30}^2 + Vd_{30}^2} \tag{19}$$

At step 68, based on the determination of the foregoing parameters, the motor drive 10 is reconnected to the motor 12. The motor 10 is driven with current that matches the phase, frequency, direction and magnitude of the back EMF. (If an induction motor is driven, a slip frequency component may be added in conventional fashion.) In FIG. 2, the rotor speed, rotor direction, back EMF magnitude and back EMF phase angle are all determined and therefore transients are minimized. In some situations, however, especially depending on the type of motor 12 being driven and the characteristics of the power source 19, it may be possible to determine a subset of these parameters and/or to determine other parameters.

It may be noted that, in the preferred process described in connection with FIGS. 2–5, the rotor speed, rotor direction, back EMF magnitude and back EMF phase angle are all determined measurements acquired by monitoring the voltage command outputs Va*, Vb* and Vc* of the current regulators 20, 21, and 22, respectively. Advantageously, therefore, the preferred process permits the rotor speed, rotor direction, back EMF magnitude and back EMF phase angle to be determined without using additional sensors such as encoders, resolvers, or voltage sensors.

Figure 6:
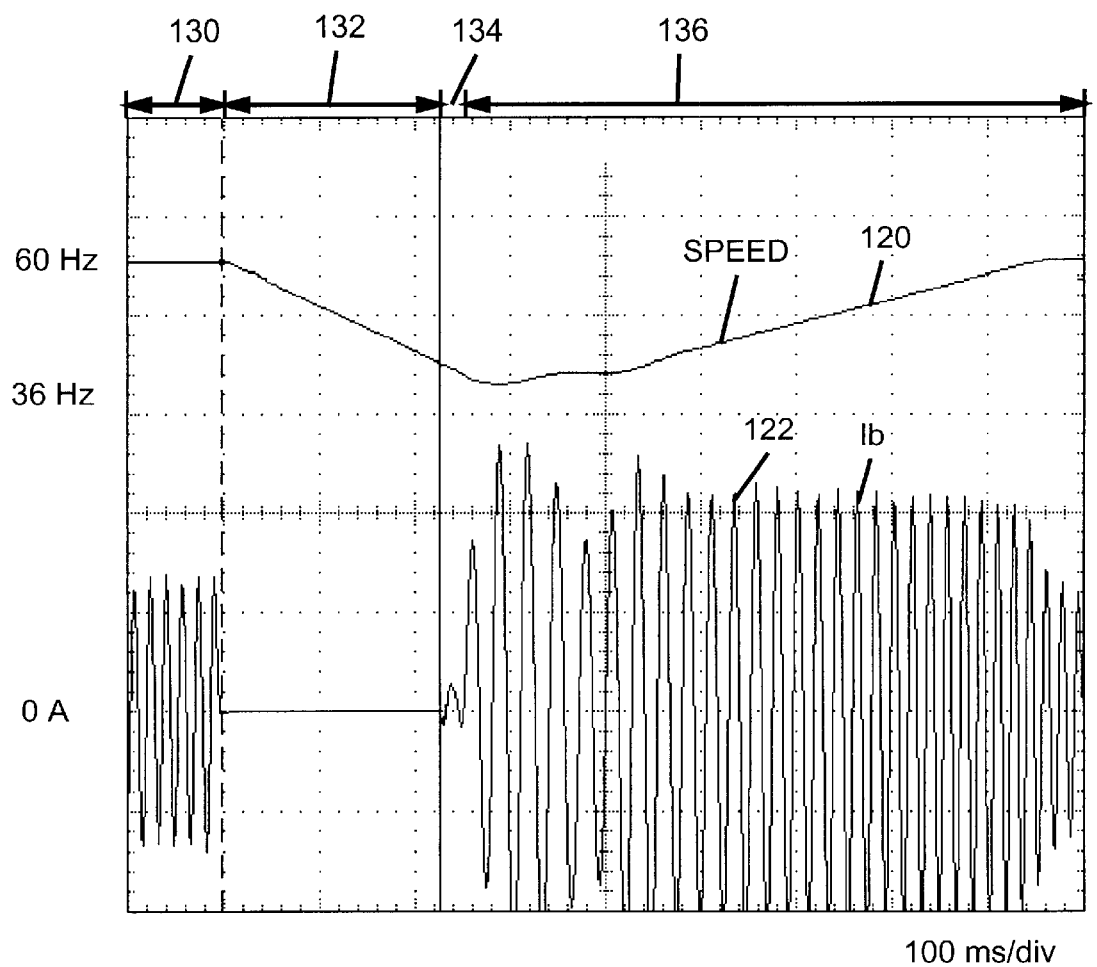
FIGS. 6–7 are oscillograms showing the operation the motor drive of FIG. 1 to reconnect to a motor.

Referring now to FIG. 6, an oscillogram showing the operation of the motor drive 10 is illustrated. Curve 120 represents the speed of the motor 12 during the reconnection operation, and curve 122 represents the motor current Ib during the reconnection operation. Initially, during an interval 130, the speed of the motor 12 is 60 Hz and the motor 12 is driven by a non-zero current Ib (as well as non-zero currents Ia and Ic, not shown) that flow through the motor 12. At the beginning of interval 132, the motor 12 becomes disconnected from the motor drive 10. Therefore, no current flows through the motor 12 and the speed decreases during the interval 132. During interval 134, the motor speed, motor direction, back EMF phase, and back EMF magnitude are determined as previously described. Notably, the back EMF measurements used to reconnect the motor 12 to the motor drive 10 are acquired during a time interval that is on the order of 20 ms or less. At the beginning of interval 136, the motor 12 is reconnected to the motor drive and the speed of the motor 12 begins to increase.

Figure 7:
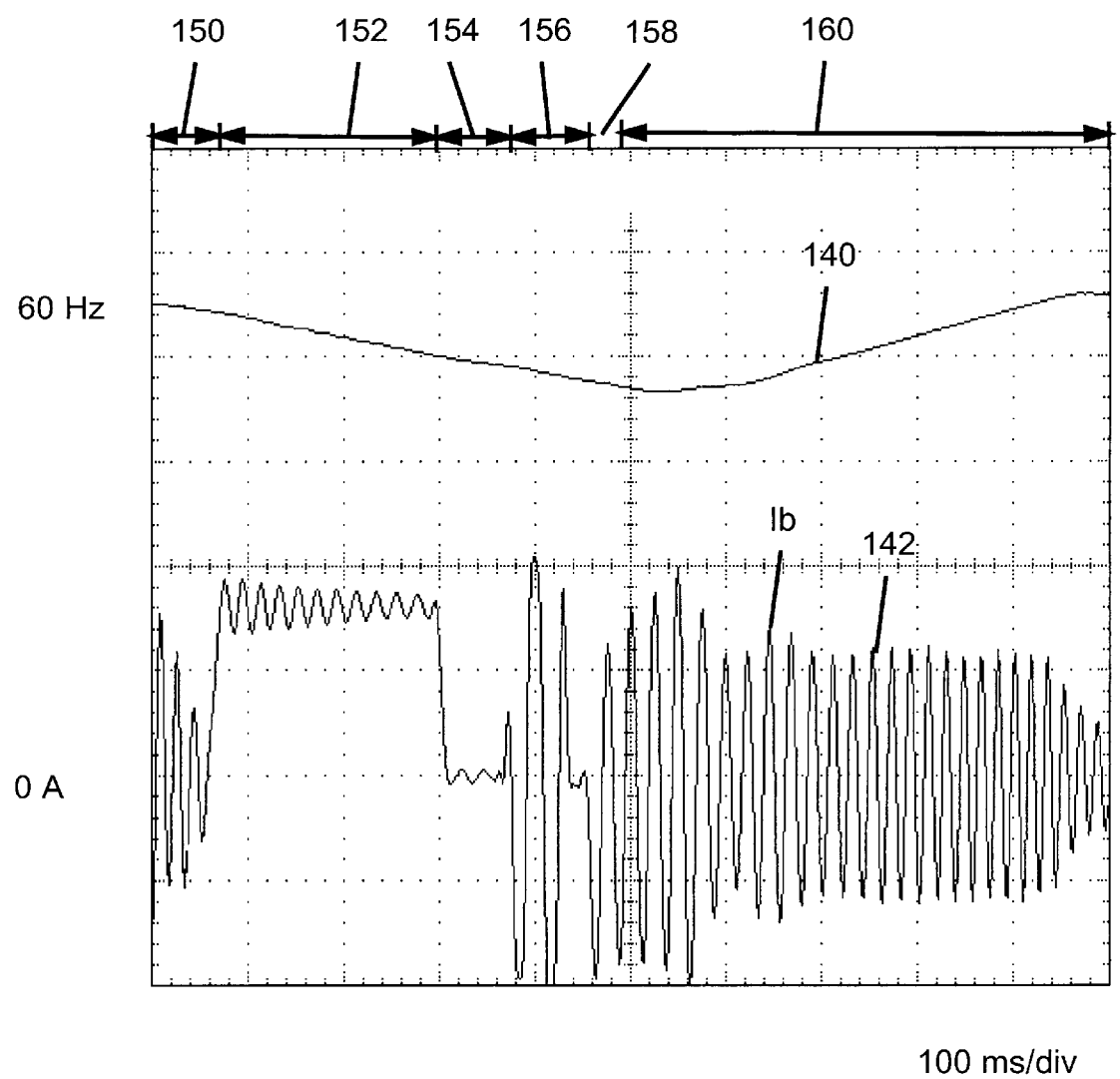

Referring now to FIG. 7, a second oscillogram showing the operation of the motor drive 10 is illustrated. Curve 140 represents the speed of the motor 12 during the reconnection operation, and curve 142 represents the motor current Ib during the reconnection operation. Initially, during an interval 150, the speed of the motor 12 is 60 Hz and the motor 12 is driven by a non-zero current Ib (as well as non-zero currents Ia and Ic, not shown) that flow through the motor 12. At the beginning of interval 152, a DC current is applied to the motor to brake the motor speed. The drive loses the speed information during DC braking. Duration interval 154, a first attempt is made to determine the motor speed, motor direction, back EMF phase, and back EMF magnitude. However, it is determined that the back EMF measurements are primarily the result of noise (step 54). Therefore, during interval 156, the motor is excited as previously described in connection with step 56. Thereafter, during interval 158, a second (successful) attempt is made to determine the motor speed, motor direction, back EMF phase, and back EMF magnitude. Notably, the back EMF measurements used to reconnect the motor 12 to the motor drive 10 are acquired during a time interval that is on the order of 150 ms or less (which includes both measurement attempts). At the beginning of interval 160, the motor 12 is reconnected to the motor drive and the speed of the motor 12 begins to increase.

Although the flowcharts show the steps being performed in a particular order, it may be noted that to a large extent the steps may in fact be performed essentially simultaneously by a microprocessor that switches between tasks. Additionally, the steps in the flowcharts could be performed in a different order than that shown. For example, the back EMF phase angles may be determined for the sample instants concurrently as the back EMF measurements are acquired, or not until later after all of the back EMF measurements have been acquired. Further, although the invention has been described in the context of reconnecting a motor drive 10 to a motor 12, the method and system of measuring a parameter of motor operation described herein could also be used in other situations.

Many changes and modifications may be made to the present invention without departing from the spirit thereof, and some of these changes have been mentioned above. The scope of these and other changes will become apparent from the appended claims.

What is claimed is:

1. A method of reconnecting a motor to a motor drive comprising:
   (A) controlling a current which flows through the motor using a current regulator, the current regulator producing a voltage command output based on a current command input;
   (B) commanding a current at the current command input of the current regulator;
   (C) acquiring back EMF measurements at different instants in time by monitoring the voltage command output of the current regulator;
   (D) determining back EMF phase angles for a plurality of the instants in time based on a respective plurality of the back EMF measurements;
   (E) determining a frequency of the back EMF based on the back EMF angles determined for the plurality of instants in time; and
   (F) reconnecting the motor drive to the motor based on the frequency of the back EMF;
   wherein the current that is controlled during the controlling step (A) is a first current, the current regulator is a first current regulator, the voltage command output is a first voltage command output, and the current command input is a first current command input;
   wherein the method further comprises (1) controlling a second current which flows through the motor using a second current regulator, the second current regulator producing a second voltage command output based on a second current command input, and (2) commanding a current at the second current command input of the second current regulator;
   wherein, during the acquiring step (C), a plurality of back EMF measurements are acquired each different instant in time, including a first back EMF measurement acquired by monitoring the first voltage command output of the first current regulator and a second back EMF measurement acquired by monitoring the second voltage command output of the second current regulator; and
   wherein the determining step (D) includes comparing the first and second back EMF measurements.

2. A method according to claim 1, wherein the determining step (B) includes determining a trigonometric relationship which is a function of the first and second back EMF measurements.

3. A method according to claim 2,
   wherein, during the comparing step, a difference between the first and second back EMF measurements is determined;
   wherein the method further comprises comparing the difference between the first and second back EMF measurements with a third back EMF measurement, including determining a ratio between (1) the first and second back EMF measurements and (2) the third back EMF measurement; and
   wherein the trigonometric relationship is an arctangent relationship and is function of the ratio between (1) the first and second back EMF measurements and (2) the third back EMF measurement.

4. A method according to claim 1, further comprising determining back EMF magnitude, including (1) squaring the first and second back EMF measurements acquired at one of the instants in time, (2) summing at least the squared first and second back EMF measurements, and (3) determining a square root of the squared and summed first and second back EMF measurements.

5. A method of reconnecting a motor to a motor drive comprising:

(A) controlling a current which flows through the motor using a current regulator, the current regulator producing a voltage command output based on a current command input;

(B) commanding a current at the current command input of the current regulator;

(C) acquiring back EMF measurements at different instants in time by monitoring the voltage command output of the current regulator;

(D) determining back EMF phase angles for a plurality of the instants in time based on a respective plurality of the back EMF measurements;

(E) determining a frequency of the back EMF based on the back EMF angles determined for the plurality of instants in time; and (F) reconnecting the motor drive to the motor based on the frequency of the back EMF;

wherein determining the frequency of the back EMF comprises (1) determining an angular difference between the back EMF phase angle determined at a first one of the instants in time and the back EMF phase angle determined at a second one of the instants in time, (2) determining a temporal difference between the first and second instants in time, and (3) determining the frequency of the back EMF as a function of the angular difference and the temporal difference.

6. A method according to claim 5, wherein at least two of the back EMF measurements are acquired during a common half cycle of the back EMF.

7. A method according to claim 5, further comprising determining a direction of rotation of the motor, including comparing the back EMF phase angle determined at a first one of the instants in time to the back EMF phase angle determined at a second one of the instants in time.

8. A method according to claim 5 wherein, during the commanding step (B), a current of zero amperes is commanded.

9. A method according to claim 5, wherein the determining step (D) comprises calculating a trigonometric function which has at least one of the back EMF measurements as an input.

10. A method of reconnecting a motor to a motor drive comprising:

(A) controlling a current which flows through the motor using a current regulator, the current regulator producing a voltage command output based on a current command input;

(B) commanding a current at the current command input of the current regulator;

(C) acquiring back EMF measurements at different instants in time by monitoring the voltage command output of the current regulator;

(D) determining back EMF phase angles for a plurality of the instants in time based on a respective plurality of the back EMF measurements;

(E) determining a frequency of the back EMF based on the back EMF angles determined for the plurality of instants in time; and (F) reconnecting the motor drive to the motor based on the frequency of the back EMF;

wherein, at each instant in time, more than one back EMF measurement is acquired.

11. A method according to claim 5, wherein the back EMF phase angles are determined by calculating an inverse trigonometric function which has the back EMF measurement at the respective instant in time as an input, wherein the first and second back EMF phase angles are separated by a discontinuity in the inverse trigonometric function, and wherein the method further comprises determining that the first and second back EMF phase angles are separated by the discontinuity and adjusting an angle change value representative of the angular difference between the first and second back EMF phase angles to account for the discontinuity.

12. A method according to claim 5, wherein the adjusting step comprises adjusting the angle change value by 360° when the magnitude of the angle change is greater than a predetermined value.

13. A method according to claim 5, wherein the current regulator is at least partially implemented in firmware executed by a microprocessor, such that the voltage command output of the current regulator is a value determined by and available within the firmware.

14. A method of reconnecting a motor to a motor drive comprising:

(A) controlling a current which flows through the motor using a current regulator, the current regulator producing a voltage command output based on a current command input;

(B) commanding a current at the current command input of the current regulator;

(C) acquiring back EMF measurements at different instants in time by monitoring the voltage command output of the current regulator;

(D) determining back EMF phase angles for a plurality of the instants in time based on a respective plurality of the back EMF measurements;

(E) determining a frequency of the back EMF based on the back EMF angles determined for the plurality of instants in time; and (F) reconnecting the motor drive to the motor based on the frequency of the back EMF;

wherein the current that is controlled during the controlling step (A) is a first current and the current regulator is a first current regulator;

wherein the method further comprises (1) controlling a second current which flows through the motor using a second current regulator, the second current regulator producing a voltage command output based on a current command input, (2) commanding a current at the second current command input of the second current regulator, and (3) exciting the motor by generating the current command input for one of the first and second current regulators as a function of the voltage command output of the other one of the first and second current regulators.

15. A method according to claim 14, further comprising determining that the back EMF measurements are invalid back EMF measurements, and wherein the exciting step is performed in response to determining that the back EMF measurements are invalid back EMF measurements.

16. A method according to claim 15, wherein the method further comprises determining angle changes between various ones of the back EMF phase angles determined during step (D), and wherein the back EMF measurements are determined to be invalid back EMF measurements on the basis of the angle changes between the various ones of the back EMF phase angles.

17. A method according to claim 16, wherein the back EMF measurements are determined to be invalid back EMF measurements on the basis that the angle changes between the various ones of the back EMF phase angles are not of generally the same magnitude.

18. A method according to claim 16, wherein the back EMF measurements are determined to be invalid back EMF measurements on the basis that a predetermined number of the angle changes between the various ones of the back EMF phase angles are not in the same direction as remaining ones of the angle changes.

19. A method of reconnecting a motor to a motor drive comprising:

(A) controlling a current which flows through the motor using a current regulator, the current regulator producing a voltage command output based on a current command input;

(B) commanding a current at the current command input of the current regulator;

(C) acquiring back EMF measurements at different instants in time by monitoring the voltage command output of the current regulator;

(D) determining back EMF phase angles for a plurality of the instants in time based on a respective plurality of the back EMF measurements;

(E) determining a frequency of the back EMF based on the back EMF angles determined for the plurality of instants in time;

(F) reconnecting the motor drive to the motor based on the frequency of the back EMF;

(G) determining angle changes between various ones of the back EMF phase angles determined during step (D); and (H) determining a direction of rotation by determining whether the angle changes are positive or negative.

20. A method of reconnecting a motor to a motor drive comprising:

(A) controlling a current which flows through the motor using a current regulator, the current regulator producing a voltage command output based on a current command input;

(B) commanding a current at the current command input of the current regulator;

(C) acquiring back EMF measurements at different instants in time by monitoring the voltage command output of the current regulator;

(D) determining back EMF phase angles for a plurality of the instants in time based on a respective plurality of the back EMF measurements;

(E) determining a frequency of the back EMF based on the back EMF angles determined for the plurality of instants in time; and (F) reconnecting the motor drive to the motor based on the frequency of the back EMF;

wherein the frequency of the back EMF is determined based on back EMF phase angles that are determined based on measurements acquired during a time interval that is less than or equal to approximately twenty milliseconds.

21. A method of reconnecting a motor to a motor drive comprising:

(A) controlling a current which flows through the motor using a current regulator, the current regulator producing a voltage command output based on a current command input;

(B) commanding a current at the current command input of the current regulator;

(C) acquiring back EMF measurements at different instants in time by monitoring the voltage command output of the current regulator;

(D) determining back EMF phase angles for a plurality of the instants in time based on a respective plurality of the back EMF measurements;

(E) determining a frequency of the back EMF based on the back EMF angles determined for the plurality of instants in time; and (F) reconnecting the motor drive to the motor based on the frequency of the back EMF;

wherein the frequency of the back EMF is determined based on back EMF phase angles that are determined based on measurements acquired during a time interval that is less than or equal to approximately one hundred fifty milliseconds.

22. A method of reconnecting a motor to a motor drive comprising:

(A) controlling a current which flows through the motor using a current regulator, the current regulator producing a voltage command output based on a current command input;

(B) commanding a current at the current command input of the current regulator;

(C) acquiring back EMF measurements at different instants in time by monitoring the voltage command output of the current regulator;

(D) determining back EMF phase angles for a plurality of the instants in time based on a respective plurality of the back EMF measurements, including determining a trigonometric relationship which is a function of the back EMF measurement at each instant in time;

(E) determining a frequency of the back EMF based on the back EMF angles determined for the plurality of instants in time, including (1) determining an angular difference between the back EMF phase angle determined at a first one of the instants in time and the back EMF phase angle determined at a second one of the instants in time, (2) determining a temporal difference between the first and second instants in time, and (3) determining the frequency of the back EMF as a function of the angular difference and the temporal difference; and (F) reconnecting the motor drive to the motor based on the frequency of the back EMF; and wherein the frequency of the back EMF is determined during step (E) based on back EMF phase angles that are determined during step (D) based on measurements acquired during step (C) during a time interval that is less than or equal to approximately one hundred fifty milliseconds.

23. A system comprising:

(A) a motor; and (B) a motor drive, including
 (1) a first current regulator, the first current regulator having a first voltage command output,
 (2) a second current regulator, the second current regulator having a second voltage command output, (3) a frequency determining system, the frequency determining system receiving a first voltage command output of the first current regulator and a second voltage command output of the second current regulator, the frequency determining system performing a first comparison of the first and second voltage commands at a first instant in time and a second comparison of the first and second voltage commands at a second in time and determining the frequency of the back EMF of the motor on the basis of the first and second comparisons; and wherein the motor drive is at least partially implemented by a microprocessor executing firmware.

24. A method of reconnecting a motor to a motor drive comprising:

(A) controlling a first current which flows through the motor using a first current regulator, the first current regulator producing a first voltage command output based on a first current command input;

(B) commanding a first current at the first current command input of the first current regulator;

(C) controlling a second current which flows through the motor using a second current regulator, the second current regulator producing a second voltage command output based on a second current command input;

(D) commanding a second current at the current command input of the second current regulator;

(E) acquiring a first back EMF measurement at different instants in time by monitoring the first voltage command output of the first current regulator;

(F) acquiring a second back EMF measurement at the different instants in time by monitoring the second voltage command output of the second first current regulator;

(G) determining a first back EMF phase angle at a first one of the instants in time, including comparing the first back EMF measurement acquired at the first one of the instants in time and the second back EMF measurement acquired at the first one of the instants in time;

(H) determining a second back EMF phase angle at a second one of the instants in time, including comparing the first back EMF measurement acquired at the second one of the instants in time and the second back EMF measurement acquired at the second one of the instants in time;

(I) determining a frequency of the back EMF based on the back EMF phase angles determined at the first and second instants in time; and (J) reconnecting the motor drive to the motor based on the frequency of the back EMF.

25. A method according to claim 24, wherein the determining steps (G) and (H) each further comprise determining a trigonometric relationship between the first and second back EMF measurements.

26. A method according to claim 25 wherein, during the comparing steps, a difference between the first and second back EMF measurements is determined;

wherein the determining steps (G) and (H) each further comprise comparing the difference between the first and second back EMF measurements with a third back EMF measurement, including determining a ratio between (1) the first and second back EMF measurements and (2) the third back EMF measurement; and wherein the trigonometric relationship is an arctangent relationship and is a function of the ratio between (1) the first and second back EMF measurements and (2) the third back EMF measurement.

27. A method according to claim 26, wherein determining the frequency of the back EMF comprises (1) determining an angular difference between the first and second back EMF phase angles, (2) determining a temporal difference between the first and second instants in time, and (3) determining the frequency of the back EMF as a function of the angular difference and the temporal difference.

28. A method according to claim 27, wherein at least two of the back EMF measurements are made during a common;, half cycle of the back EMF.

29. A method according to claim 28, wherein the back EMF phase angles are determined by calculating an inverse trigonometric function which has the back EMF measurement at the respective instant in time as an input, wherein the first and second back EMF phase angles are separated by a discontinuity in the inverse trigonometric function, and wherein the method further comprises determining that the first and second back EMF phase angles are separated by the discontinuity and adjusting an angle change value representative of the angular difference between the first and second back EMF phase angles to account for the discontinuity.

30. A method according to claim 27, wherein the current regulator is at least partially implemented in firmware executed by a microprocessor, such that the voltage command output of the current regulator is a value determined by and available within the firmware.

31. A method comprising:

(A) acquiring back EMF measurements at different instants in time;

(B) determining back EMF phase angles for a plurality of the instants in time based on a respective plurality of the back EMF measurements; and (C) determining a frequency of the back EMF based on the back EMF angles determined for the plurality of instants in time; and wherein, at each instant in time, more than one back EMF measurement is acquired.

32. A method according to claim 31, wherein, the more than one back EMF measurement includes a first back EMF measurement and a second back EMF measurement; and wherein the determining step (B) includes comparing the first and second back EMF measurements.

33. A method according to claim 32, wherein the determining step (B) includes determining a trigonometric relationship which is a function of the first and second back EMF measurements.

34. A method according to claim 33, wherein, during the comparing step, a difference between the first and second back EMF measurements is determined;

wherein the method further comprises comparing the difference between the first and second back EMF measurements with a third back EMF measurement, including determining a ratio between (1) the first and second back EMF measurements and (2) the third back EMF measurement; and wherein the trigonometric relationship is an arctangent relationship and is a function of the ratio between (1) the first and second back EMF measurements and (2) the third back EMF measurement.

35. A method according to claim 32, further comprising determining back EMF magnitude, including (1) squaring the first and second back EMF measurements acquired at one of the instants in time, (2) summing at least the squared first and second back EMF measurements, and (3) determining a square root of the squared and summed first and second back EMF measurements.

36. A method according to claim 32, wherein the first and second back EMF measurements are acquired from a motor, and further comprising reconnecting a motor drive to the motor based on the frequency of the back EMF.

37. A method according to claim 31, wherein the frequency of the back EMF is determined based on back EMF phase angles that are determined based on measurements acquired during a time interval that is less than or equal to approximately twenty milliseconds.

38. A method according to claim 31, wherein the frequency of the back EMF is determined based on back EMF phase angles that are determined based on measurements acquired during a time interval that is less than or equal to approximately one hundred fifty milliseconds.

39. A method of reconnecting a motor to a motor drive comprising:
   (A) acquiring back EMF measurements at different instants in time;
   (B) determining back EMF phase angles for a plurality of the instants in time based on a respective plurality of the back EMF measurements;
   (C) determining a frequency of the back EMF based on the back EMF angles determined for the plurality of instants in time, including
      (1) determining an angular difference between the back EMF phase angle determined at a first one of the instants in time and the back EMF phase angle determined at a second one of the instants in time,
      (2) determining a temporal difference between the first and second instants in time, and
      (3) determining the frequency of the back EMF as a function of the angular difference and the temporal difference; and
   (D) reconnecting the motor drive to the motor based on the frequency of the back EMF.

40. A method according to claim 39, further comprising determining a direction of rotation of the motor, including comparing the back EMF phase angle determined at the first one of the instants in time to the back EMF phase angle determined at the second one of the instants in time.

41. A method according to claim 39, wherein the determining step (B) comprises calculating a trigonometric function which has at least one of the back EMF measurements as an input.

42. A method according to claim 39, wherein the back EMF phase angles are determined by calculating an inverse trigonometric function which has the back EMF measurement at the respective instant in time as an input, wherein the first and second back EMF phase angles are separated by a discontinuity in the inverse trigonometric function, and wherein the method further comprises determining that the first and second back EMF phase angles are separated by the discontinuity and adjusting an angle change value representative of the angular difference between the first and second back EMF phase angles to account for the discontinuity.

43. A method according to claim 39, wherein the adjusting step comprises adjusting the angle change value by 360° when the magnitude of the angle change is greater than a predetermined value.

44. A method comprising:
   (A) controlling a current which flows through a motor using a current regulator, the current regulator producing a voltage command output based on a current command input;
   (B) commanding a current at the current command input of the current regulator;
   (C) acquiring back EMF measurements at different instants in time by monitoring the voltage command output of the current regulator;
   (D) determining back EMF phase angles for a plurality of the instants in time based on a respective plurality of the back EMF measurements; and
   (E) determining a frequency of the back EMF based on the back EMF angles determined for the plurality of instants in time; and
   wherein, at each instant in time, more than one back EMF measurement is acquired.

45. A method according to claim 44,
   wherein the current that is controlled during the controlling step (A) is a first current and the current regulator is a first current regulator;
   wherein the method further comprises (1) controlling a second current which flows through the motor using a second current regulator, the second current regulator producing a voltage command output based on a current command input, (2) commanding a current at the second current command input of the second current regulator, and (3) exciting the motor by generating the current command input for one of the first and second current regulators as a function of the voltage command output of the other one of the first and second current regulators.

46. A method according to claim 44, further comprising determining that the back EMF measurements are invalid back EMF measurements, and wherein the exciting step is performed in response to determining that the back EMF measurements are invalid back EMF measurements.

47. A method according to claim 46, wherein the method further comprises determining angle changes between various ones of the back EMF phase angles determined during step (D), and wherein the back EMF measurements are determined to be invalid back EMF measurements on the basis of the angle changes between the various ones of the back EMF phase angles.

48. A method according to claim 47, wherein the back EMF measurements are determined to be invalid back EMF measurements on the basis that the angle changes between the various ones of the back EMF phase angles are not of generally the same magnitude.

49. A method according to claim 47, wherein the back EMF measurements are determined to be invalid back EMF measurements on the basis that a predetermined number of the, angle changes between the various ones of the back EMF phase angles are not in the same direction as remaining ones of the angle changes.

50. A method according to claim 44, wherein the frequency of the back EMF is determined based on back EMF phase angles that are determined based on measurements acquired during a time interval that is less than or equal to approximately twenty milliseconds.

* * * * *